US009156194B2

(12) United States Patent
Ng et al.

(10) Patent No.: US 9,156,194 B2
(45) Date of Patent: Oct. 13, 2015

(54) DIGITAL 3D FABRICATION USING MULTI-LAYERED MOLD

(71) Applicant: Palo Alto Research Center Incorporated, Palo Alto, CA (US)

(72) Inventors: Tse Nga Ng, Palo Alto, CA (US); JengPing Lu, Fremont, CA (US); Eugene M. Chow, Fremont, CA (US); Timothy David Stowe, Alameda, CA (US); Janos Veres, San Jose, CA (US); Philipp H. Schmaelzle, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 307 days.

(21) Appl. No.: 13/831,358

(22) Filed: Mar. 14, 2013

(65) Prior Publication Data

US 2014/0272121 A1    Sep. 18, 2014

(51) Int. Cl.
*B29C 33/38* (2006.01)
*B29C 67/00* (2006.01)
*B29C 33/44* (2006.01)
*B29C 33/00* (2006.01)

(52) U.S. Cl.
CPC ......... *B29C 33/3835* (2013.01); *B29C 33/3842* (2013.01); *B29C 33/448* (2013.01); *B29C 67/0051* (2013.01); *B29C 67/0055* (2013.01); *B29C 33/005* (2013.01); *B29C 2033/385* (2013.01)

(58) Field of Classification Search
None
See application file for complete search history.

(56) References Cited

U.S. PATENT DOCUMENTS

| 5,590,454 | A | * | 1/1997 | Richardson | 29/527.4 |
| 5,643,367 | A | * | 7/1997 | Viel | 134/1 |
| 6,021,358 | A | * | 2/2000 | Sachs | 700/98 |
| 7,169,649 | B2 | | 1/2007 | Rosa et al. | |
| 7,211,504 | B2 | | 5/2007 | Uhlendorf | |
| 7,320,936 | B2 | | 1/2008 | Brunet et al. | |
| 2004/0175938 | A1 | * | 9/2004 | Grunwald | 438/678 |
| 2005/0154567 | A1 | * | 7/2005 | Jackman et al. | 703/2 |

OTHER PUBLICATIONS

Aigner, Florian. "3D-Printer with Nano-Precision: Ultra-high-resolution 3D Printer Breaks Speed-Records at Vienna University of Technology", Vienna University of Technology website, Mar. 12, 2012, http://www.tuwien.ac.at/en/news/news_detail/article/7444/.

Lee, K. S. et al. "Recent Advances in Two-Photon Lithography", Korea Advanced Institute of Science and Technology, Laser Science Research Lab, International Journal, No. 105, CIF'8 Proceeding, 2008, 15 pages.

* cited by examiner

*Primary Examiner* — Timothy Meeks
*Assistant Examiner* — Michael P Rodriguez
(74) *Attorney, Agent, or Firm* — Bever, Hoffman & Harms, LLP (57) ABSTRACT

A replica 3D structure is fabricated inside a multi-layered mold by patterning each mold layer to define a void/opening that matches a corresponding cross section of the structure's peripheral surface, and filling the patterned opening of each layer with a structural material (i.e., before depositing a subsequent layer of mold material). The mold material (e.g., photoresist or another dissolvable sacrificial material) is blanket deposited (e.g., by slot-die, spray coating) and then patterned using a laser or a printed mask. Each layer of modeling material (e.g., polymer, ceramic or metal, or a combination thereof) is electro-plated or otherwise deposited on the previously formed modeling material layer. High vertical resolution is achieved by utilizing relatively thin mold layers. The mold layer deposition, patterning and modeling material deposition is repeated until the replica 3D structure is entirely formed inside the multi-layered mold, and then the mold is dissolved or otherwise removed.

19 Claims, 9 Drawing Sheets

DIGITAL 3D FABRICATION USING MULTI-LAYERED MOLD

FIELD OF THE INVENTION

The present invention relates to digital three-dimensional (3D) object fabrication, and more particularly to methods capable of fabricating 3D structures on a mesoscale (i.e., in the range of 1 to 40 µm).

BACKGROUND OF THE INVENTION

Digital 3D fabrication is utilized to replicate complex structures that are difficult to make with bulk machining. Existing 3D fabrication techniques such as inkjet/extrusion and "two-photon lithography" (TPL) are utilized to produce tiny structures with features on a micron (µm) or nanometer scale, but have drawbacks in terms of resolution and z-height limits. The resolution of 3D inkjet or extrusion printer is acutely affected by the composition of solution inks, and often the requirements for good printing are in conflict with the desired mechanical properties in the printed structures. For example, the solid loading in nanoparticle inks is kept low to avoid particle agglomeration and clogging of ejectors, but in terms of structural integrity, higher loading is preferable to minimize shrinkage and facilitate solidification. The colloidal suspension for inkjet and extrusion are already at picoliter volume in order to reach 40 µm resolution (~600 dpi in Objet 3D printer). For further improvement, the droplet volume has been successfully reduced by applying an electric field, but the reduced volume that enables higher the resolution will trade off with speed in the process. Major breakthroughs in the write speed for TPL were announced in 2012 by the Vienna University of Technology on a research TPL system, and in 2013 by Nanoscribe GmbH in a commercial TPL system. However, large vertical distance is still problematic for TPL, because the focal length of TPL optical system is limited to few hundred microns maximum.

What is needed is a process for fabricating 3D structures that avoids the resolution and z-height limit restrictions of conventional modeling methods.

SUMMARY OF THE INVENTION

The present invention is directed to the fabrication of a replica 3D structure that avoids the resolution and z-height limit restrictions of conventional methods by utilizing the 3D structure's digital description to generate a mold that is patterned and filled with a modeling material (including insulator, to semiconductor, to conductor) on a layer by layer basis, with the mold being removed after the 3D structure is completed. By constructing the 3D structure using materials that are shaped by the patterned void regions defined in the multi-layered mold and supported within the mold, the present invention allows de-coupling of printing resolution and z-height limit from other characteristics, such as electrical, optical, and mechanical properties of the structures. The electrical property includes filling in the voids with a conductor, so it can be used for electrical wiring. Optical properties can be adjusted by filling in materials with different reflective index for waveguides. Because the mold and structure sections are generated in successive layers, the present invention facilitates adjustment of the replica's vertical resolution by reducing the thickness of the layers/sections. Another advantage of the above approach is that errors are detectable by optical inspection, and are easily corrected during fabrication. Further, although the disclosed fabrication technique is primarily optimized for the fabrication of 3D structures on a mesoscale (i.e., objects having feature sizes in the range of 1 to 40 µm), the present invention is easily modified for the generation of larger objects. In addition, the disclosed fabrication technique allows high-speed processing using, for example, a continuous roll architecture or continuous belt arrangement.

According to exemplary embodiments, the present invention is directed to a system and method for producing replica 3D structures using a digital description of an exterior peripheral surface of an original 3D object. The digital description, which is generated, e.g., using a commercially available 3D modeling system, is processed to form digital layer data portions, each layer data portion corresponding to the peripheral surface features of an associated z-height cross-section of the original 3D object. The layer data portions are then utilized to control mold generation and modeling material deposition systems to sequentially generate sections of the replica 3D structure, beginning with the layer data portion associated with the lowermost section of the original 3D object and ending with the layer data portion associated with the uppermost section. Specifically, a first layer data portion is utilized to deposit a corresponding lowermost mold material layer (e.g., photoresist or soluble polymer) having a predetermined z-height thickness, the first mold material layer is then patterned such that a portion of the mold material is removed to define a void portion having a peripheral shape comparable to the corresponding lowermost section of the original 3D object, and then an amount of structural material (e.g., a polymer, ceramic or metal) is deposited that substantially fills the void. The deposited structural modeling material is allowed to harden (e.g., annealed if necessary) to form a lowermost z-height section of the replica 3D structure entirely surrounded by the lowermost mold layer. A next-sequential layer data portion is then utilized to deposit, pattern and fill a next sequential mold layer on the lowermost mold layer, thereby forming a next-sequential z-height section of the replica 3D structure. This process is repeated for each layer data portion of the digital description until the modeling sections disposed inside the resulting multi-layer mold collectively form the replica 3D structure. The multi-layered mold is then removed (e.g., dissolved) to release the replica 3D structure.

Alternative techniques and materials are utilized according to various specific embodiments of the present invention. For example, photoresist is utilized to form the mold layers in embodiments used to produce replica 3D structure on a mesoscale. Alternatively, another dissolvable sacrificial material (e.g., wax) may be used to form one or more layers of the mold. The mold material is deposited using any suitable deposition technique, such as slot-die coating, spray coating or roll coating, with a preference for deposition techniques that allow precise layer thickness control. Mold material patterning is alternatively performed using, for example, laser processing, laser ablation and printed-mask lithography techniques. Modeling material deposition is alternatively performed using, for example, electro-plating or liquid/paste printing techniques. Because each structure section is formed separately, the present invention facilitates forming the replica 3D structure using different modeling materials (e.g., alternating the material used for each section, or changing the modeling material in a sequence that generates a gradient). Annealing can be formed as needed, either after each structure section is formed, or after the formation of a suitable number of sections.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in 3D fabrication. The following description is presented to enable one of ordinary skill in the art to make and use the invention as provided in the context of a particular application and its requirements. As used herein, directional terms such as "upper", "uppermost", "lower", and "lowermost" are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
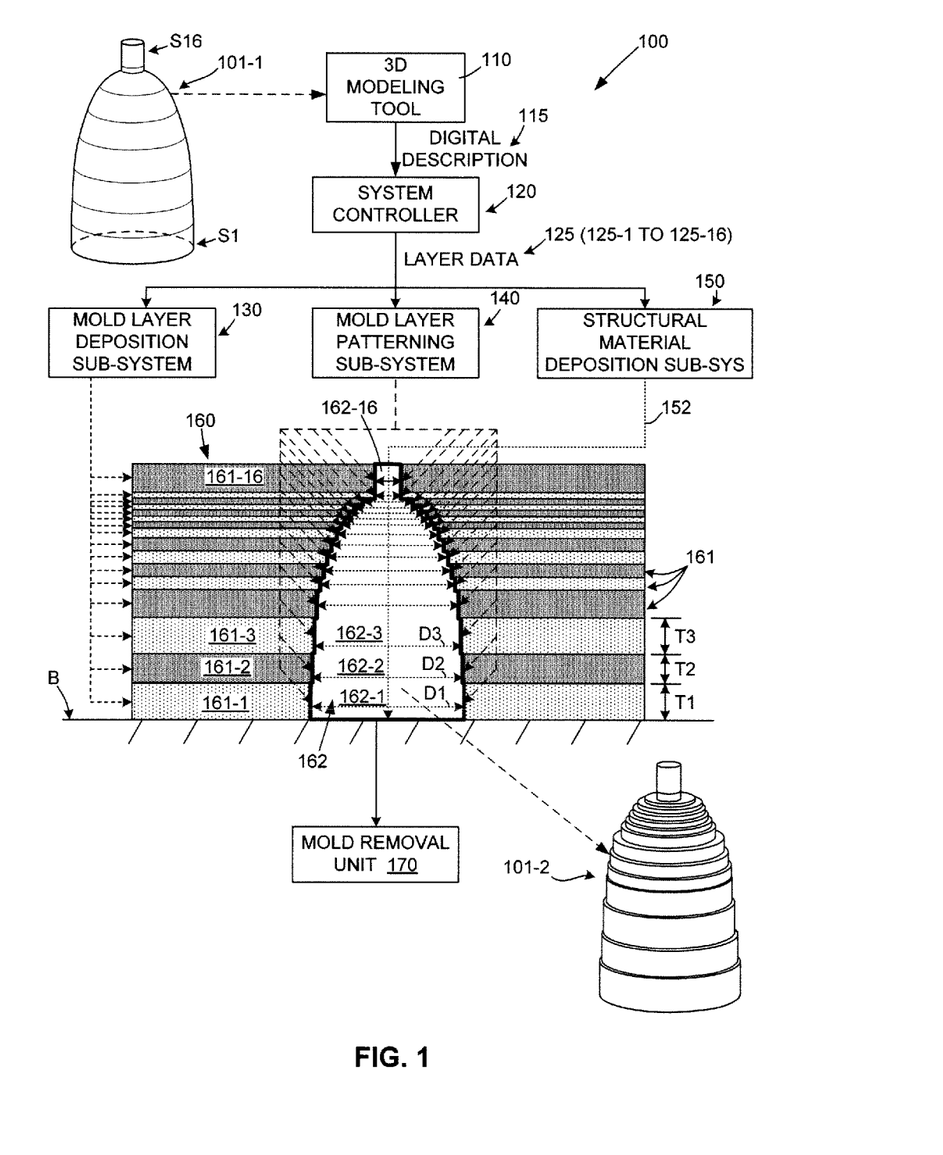
FIG. 1 is diagram showing a system for fabricating 3D structures according to a generalized embodiment of the present invention.

FIG. 1 shows a generalized system 100 for reproducing an original 3D object 100-1 (e.g., a bottle-shaped structure having the shape shown in the top left corner of FIG. 1) as a solid, replica 3D structure 101-2 (depicted in the lower right corner of FIG. 1), where the physical size of replica 3D structure 101-2 is typically many times smaller than that of original 3D object 101-1, but may be the same size or larger.

Generalized system 100 includes an optional 3D modeling tool 110, a system controller 120, mold/replica fabrication equipment including a mold layer deposition sub-system 130, a mold layer patterning sub-system 140 and a material deposition sub-system, and a mold removal unit 170. The various tools and sub-systems shown in FIG. 1 are implemented in various ways according to alternative embodiments of the present invention, some of which are described below with reference to the figures. Generalized system 100 is intended to conveniently illustrate the general methodology utilized in accordance with the various embodiments of the present invention, and is not intended to be limiting (e.g., mold deposition sub-system 130 and mold layer patterning sub-system 140 may be implemented by a single processing tool).

Referring to the upper portion of FIG. 1, the methodology of the present invention utilizes a digital description 115 that is either based on or otherwise describes an "original" 3D object 101-1, and is stored in a form that can be processed by system controller 120. In one embodiment, digital description 115 is generated by a commercially available 3D modeling system 110. In an alternative embodiment, digital description 115 is generated based on an original concept utilizing a computer-aided design (CAD) software tool. That is, the existence of 3D object 101-1 in a physical form is not necessary to the process described below, and is provided herein merely to illustrate features of replica 3D structures generated from digital description 115 using the methodology associated with the present invention.

Controller 120 serves to process digital description 115 in the manner described below to generate digital layer data 125, which is then transmitted to the various production sub-systems. In one embodiment, controller 120 is a computer or workstation that interprets and processes digital description 115 utilizing software developed in accordance with known image processing techniques to generate multiple layer data portions 125-1 to 125-16, each layer data portion including z-height (thickness) and shape/size pattern information for a corresponding z-height cross-section of the replica 3D structure. For example, a first layer data portion 125-1 (corresponding to a lowermost z-height section S1 of original 3D object 101-1) includes information regarding a z-height thickness T1 and a circular diameter D1 that are utilized to subsequently form, pattern and fill associated mold layer 161-1. Additional layer data portions include similar information (e.g., data portions associated with mold layers 161-2 and 161-3 include thickness data T2 and T3 and diameter data D2 and D3, respectively), along with positioning data that properly aligns the sequential patterned mold layers (e.g., such that each circular section of replica 3D structure 101-2 is concentric with all other sections, per original 3D object 101-1).

Figure 2A:
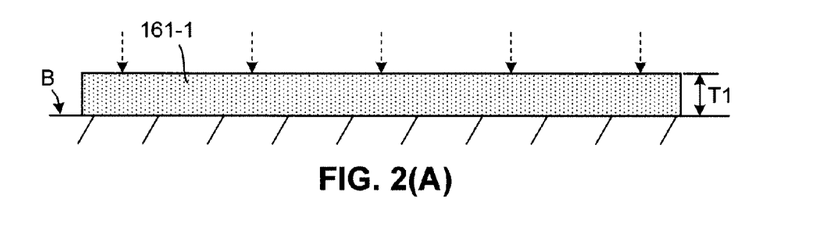
FIGS. 2(A), 2(B), 2(C) and 2(D) are cross-sectional side views showing the deposition and patterning of a first mold layer and subsequent deposition of a first layer of modeling material according to an exemplary embodiment of the present invention.
Figure 2B:
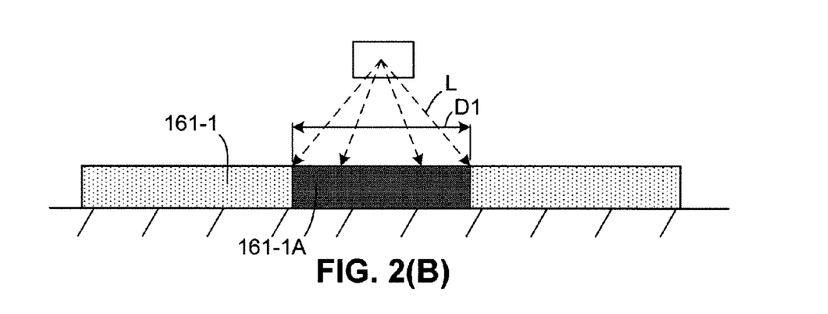
Figure 2D:
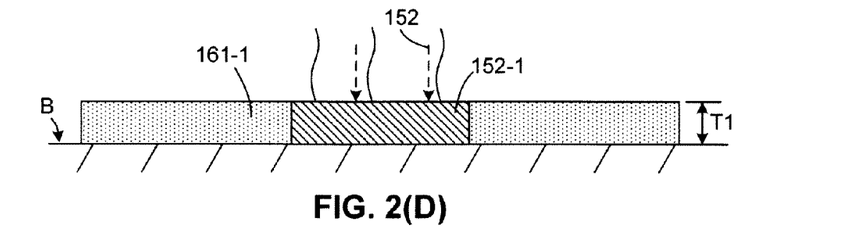
Figure 3A:
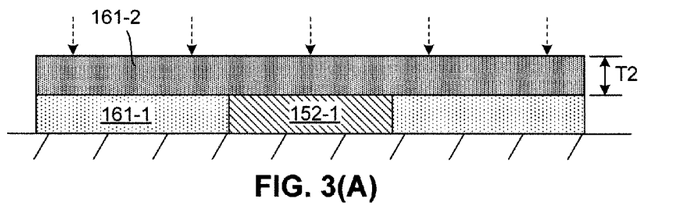
FIGS. 3(A), 3(B), 3(C) and 3(D) are cross-sectional side views showing the deposition/patterning of a second mold layer over the first mold layer, and deposition of a second modeling material layer according to an exemplary embodiment of the present invention.
Figure 5:
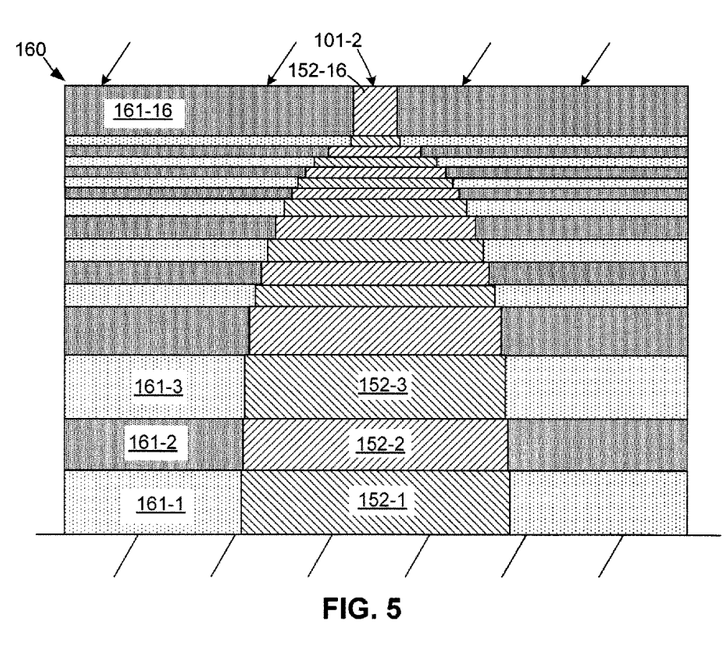
FIG. 5 is a cross-sectional side view showing a completed multi-layer 3D structure encased in a multi-layer mold prior to release.

Mold layer deposition sub-system 130 sequentially deposits a selected mold material (e.g., photoresist or a dissolvable sacrificial material such as wax) such that the mold material forms a series of stacked mold material layers 161-1 to 161-16 that collectively form multi-layer mold 160. Mold layer deposition sub-system 130 is implemented by any suitable commercially available tool or system capable of forming the mold layers in the manner described herein. In one embodiment, sub-system 130 operates in accordance with z-height layer information contained in layer data portions 125-1 to 125-16 to respectively sequentially form stacked mold material layers 161-1, 161-2, 161-3 . . . 161-16. For example, as illustrated in FIG. 2(A), mold layer deposition sub-system 130 deposits lowermost layer 161-1 on a base surface B such that lowermost layer 161-1 has predetermined thickness T1 in accordance with z-height data provided in associated first layer data portion 125-1. In a practical mesoscale embodiment, layer 161-1 comprises a photoresist layer having a thickness T1 in the range of 1 and 100 μm. Subsequently, as indicated in FIG. 3(A) (i.e., after lowermost layer 161-1 is processed in the manner described below with reference to FIGS. 2(B) to 2(D)), mold layer deposition sub-system 130 deposits a second layer 161-2 having thickness T2 on lowermost layer 161-1 per a next sequential mold layer data portion. Each subsequent mold material layer 161-3 to 161-16 is then deposited on the previously formed mold layer such that mold material layers 161-1 to 161-16 collectively form multi-layered mold 160, as shown in FIGS. 1 and 5. By utilizing a suitable deposition tool, the thicknesses of each layer may be either the same or different from each other (e.g., thickness T1 of layer 161-1 may be larger or smaller than thickness T2 or layer 161-2).

Figure 2C:
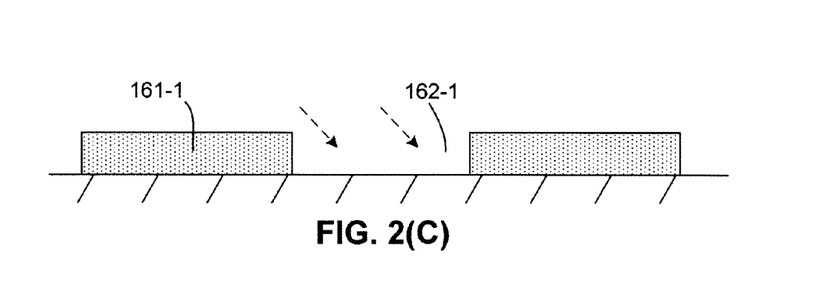
Figure 3B:
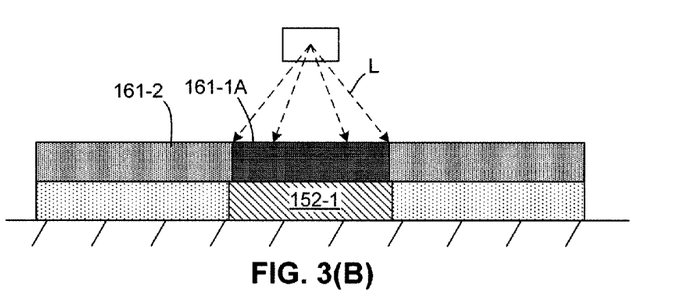
Figure 3C:
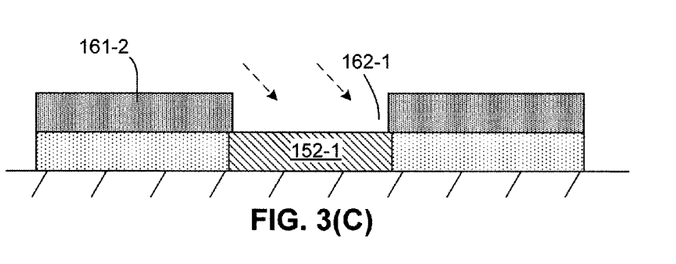

Referring again to FIG. 1, patterning sub-system 140 serves to individually patterning each of the mold material layers 161-1 to 161-16 in accordance with digital description 115 (e.g., in accordance with pattern size, shape and location portion of mold layer data 125) such that each mold material layer defines a corresponding void portion. Patterning sub-system 140 is implemented by any suitable commercially available tool/tools or systems capable of forming voids in each of the mold layers in the manner described herein. In one embodiment, sub-system 140 operates in accordance with pattern size, shape and position information contained in layer data portions 125-1 to 125-16 to respectively sequentially form voids 162-1, 162-2, 162-3 . . . 162-16 in each of the stacked mold material layers 161-1, 161-2, 161-3 . . . 161-16, respectively, using a laser patterning process. For example, as illustrated in FIG. 2(B), sub-system 140 directs a laser beam L utilizing an optical system (e.g., an adjustable mirror) onto a target portion 161-1A of lowermost photoresist layer 161-1. The exposed photoresist structure is then shuttled to a development stage where, as indicated in FIG. 2(C), the exposed (target) photoresist portion is then removed to define a void (opening) 162-1, which is characterized by being entirely surrounded by non-exposed photoresist 161-1. Photoresist layer 161-1 is thus digitally pattern by laser exposure, and an advantage of this approach is that higher resolution is achievable through tuning the laser wavelength and focusing the associated optics. This approach also enables the creation of complex substantially 2D shapes that are combined to build the replica 3D structure layer-by-layer. This layered approach allows another degree of freedom in the vertical dimension and overcome the spatial limitations in other optical processes such as TPL. Subsequent photoresist layers are processed the same manner manner. For example, as indicated in FIGS. 3(B) and 3(C), second photoresist 161-2 is processed by laser beam L to generate exposed photoresist portion 161-2A, which is then removed to generate a void 162-2. Note that void 162-2 exposes the upper surface of previously formed structure segment 152-1, which is formed as described below.

Figure 3D:
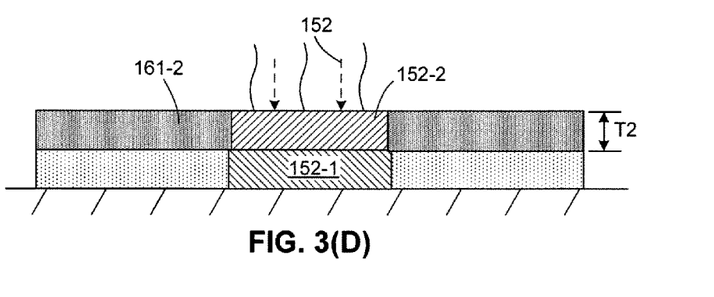

Referring again to FIG. 1, modeling material deposition sub-system 150 deposits modeling material 152 into void portions 162-1 to 162-16 such that each void portion is filled with an associated amount (portion) of modeling material 152 before a subsequent mold material layer is formed, whereby the series of deposited modeling material portions disposed in mold material layers 161-1 to 161-16 collectively form replica 3D structure 101-2. Modeling material deposition sub-system 150 is implemented by any suitable commercially available tools or systems capable of filling the voids in each mold material layer in the manner described herein. In one embodiment, sub-system 150 deposits modeling material inside voids formed in photoresist layers by way of an electroplating bath. For example, as indicated in FIG. 2(D), modeling material 152 is electroplated onto base surface B until a resulting lowermost structure section 152-1 has the same thickness (i.e., thickness T1) as that of lowermost photoresist layer 161-1. Similarly, as indicated in FIG. 3(D), modeling material 152 is subsequently electroplated onto lowermost structure section 152-1 until a resulting second structure section 152-2 has the same thickness (i.e., thickness T2) as that of second photoresist layer 161-2. Technologically, the time required for electroplating may be the limiting factor to high throughput. Assuming that the rate of deposition is not limited by electrolyte concentration and only depends on the charge transferred, the time for depositing a 100 nm Ni film will be roughly 30 ms at current density of 100 mA/cm$^2$. This translates to a substrate speed of 0.3 m/s (=1 cm/30 ms), which is on par with the inkjet process. Faster throughput is achievable by lengthening the electroplating submersion path. In other embodiments, modeling materials such as polymers and ceramics are deposited as filler materials in the form of colloids and powders using micro-printing or other deposition techniques.

As indicated by the wavy lines above structure sections 152-1 and 152-2 in FIGS. 2(D) and 3(D), depending on the modeling material and/or deposition process, an optional annealing process is performed to solidify the deposited modeling material. In one embodiment, each section of modeling material is annealed after each deposition process (e.g., section 152-1 is annealed as shown in FIG. 2(D), and then subsequently formed section 152-2 is annealed as shown in FIG. 3(D)). In another embodiment, two or more sections are deposited between annealing processes (e.g., annealing is not performed after the deposition of section 152-1 in FIG. 2(D), but is performed after the subsequent formation of section 152-2 as shown in FIG. 3(D)).

Figure 4:
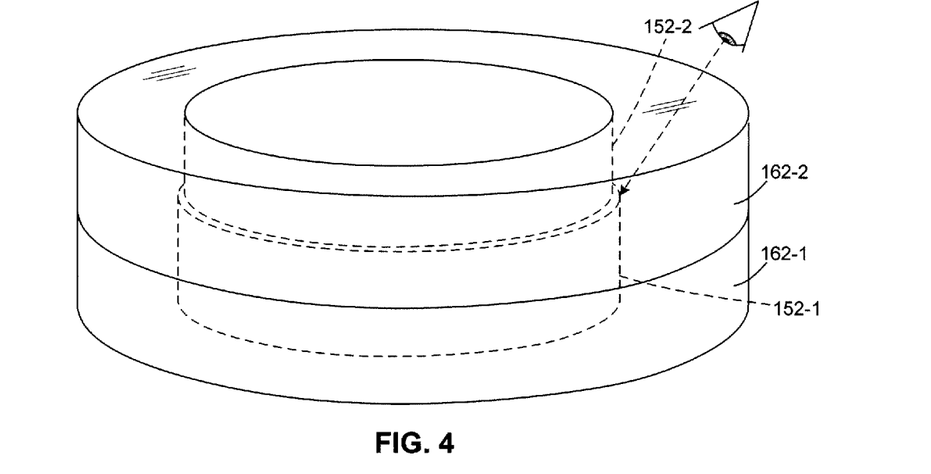
FIG. 4 is a perspective view showing the two-layer partial structure of FIG. 3(D)

According to another embodiment, visual or optical inspection of at least one of the deposited modeling material portions is performed before depositing a subsequent mold material layer. For example, FIG. 4 shows a partial structure formed after the deposition step of FIG. 3(D), where structure section 152-2 is disposed on structure section 152-1, and both are encased within a partial mold comprising lowermost layer 161-1 and second layer 161-2. By utilizing a suitably transparent mold material, another advantage of the present invention is that errors (e.g., an error in the alignment between sections 152-1 and 152-2) can be detected by optical inspection, and are easily corrected during fabrication. For example, if there is problem with section stitching or dimensional change, the digital pattern is adjusted by the printing software algorithms to compensate for any misalignment.

FIG. 5 shows replica 3D structure 101-2 encased inside multi-layer mold 160 after processing of the digital description is completed, and illustrates that each of the sections 152-1, 152-2, 152-3 . . . 152-16 that collectively form replica 3D structure 101-2 are surrounded by a corresponding mold material layer 161-1, 161-2, 161-3 . . . 161-16 that collectively form multi-layer mold 160.

Referring again to the bottom of FIG. 1, a final production process involves utilizing a suitable unit or tool 170 to remove mold 160, thereby releasing replica 3D structure 101-2. In one embodiment, removal of mold 160 involves utilizing a suitable solvent to dissolve the mold (e.g., photoresist) material using methods known in the semiconductor processing field.

Figure 6:
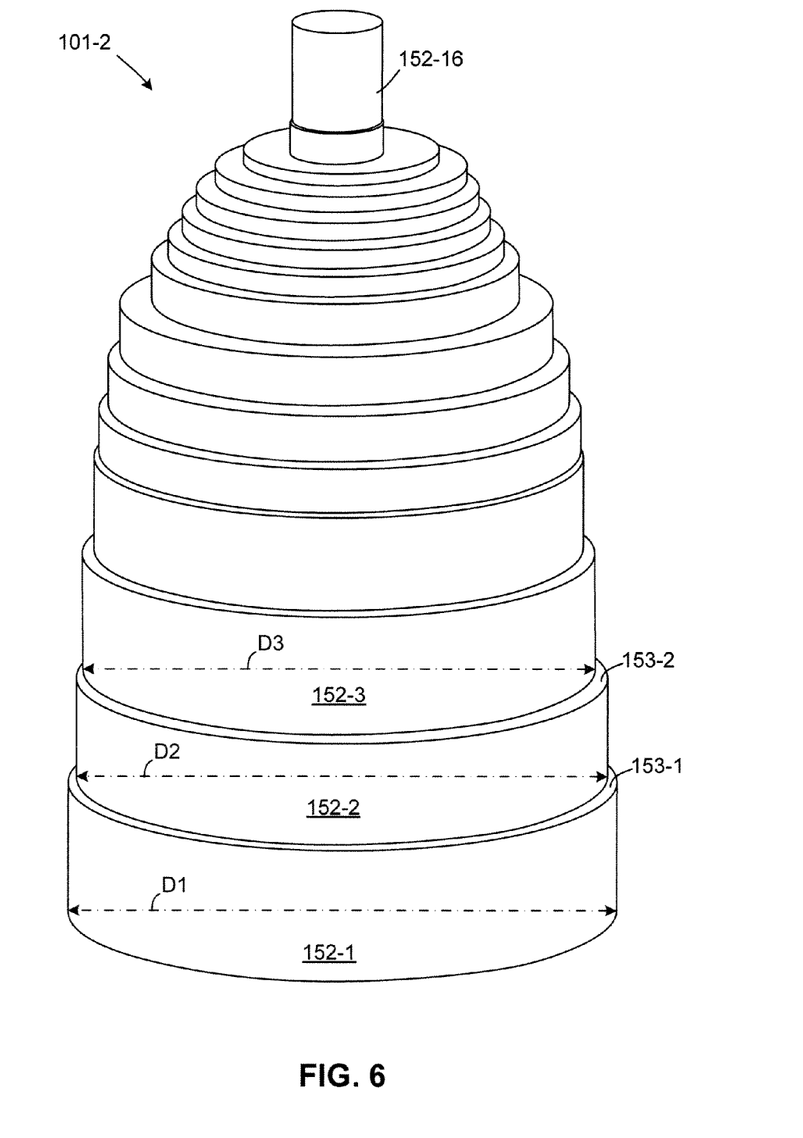
FIG. 6 is a perspective view showing the 3D structure of FIG. 5 after removal of the multi-layer mold.

FIG. 6 shows replica 3D structure 101-2 after being released from its mold, and indicates a characteristic feature of structures produced in accordance with the present invention, namely that a shoulder is formed between each adjacent section in which a dimension change has occurred. For example, because diameter D1 of lowermost section 152-1 is slightly larger than diameter D2 of section 152-2, a shoulder 153-1 is formed at the interface between these two sections. Similarly, because diameter D2 of section 152-2 is slightly larger than diameter D3 of section 152-3, a shoulder 153-2 is formed at the interface between these sections 152-2 and 152-3. These shoulders generate a striated surface feature that is characteristic of typical objects produced in accordance with the present invention.

Figure 7A:
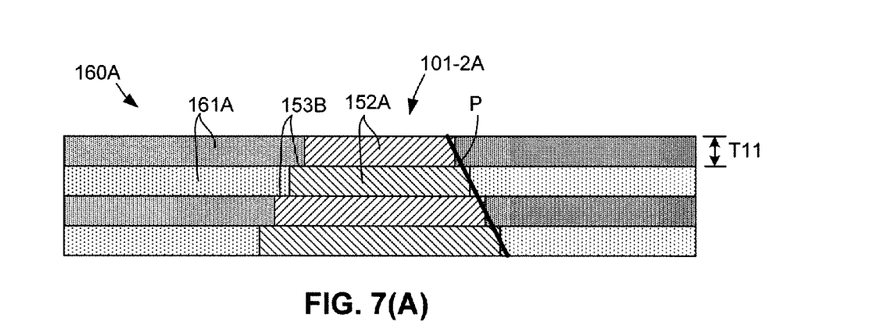
FIGS. 7(A), 7(B) and 7(C) are cross-sectional side views illustrating how different mold layer thicknesses are used to generate a smoother replica surface.
Figure 7B:
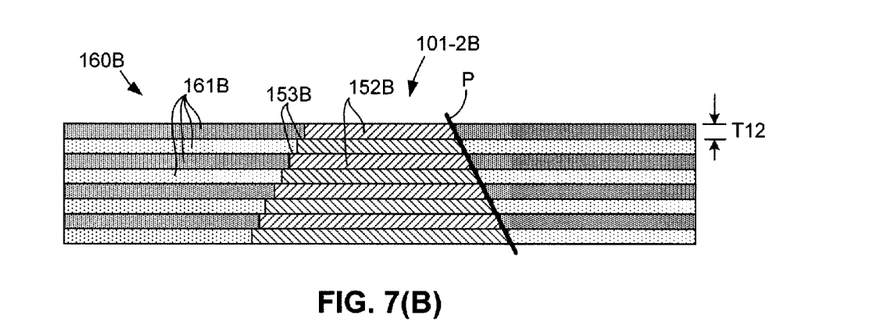
Figure 7C:
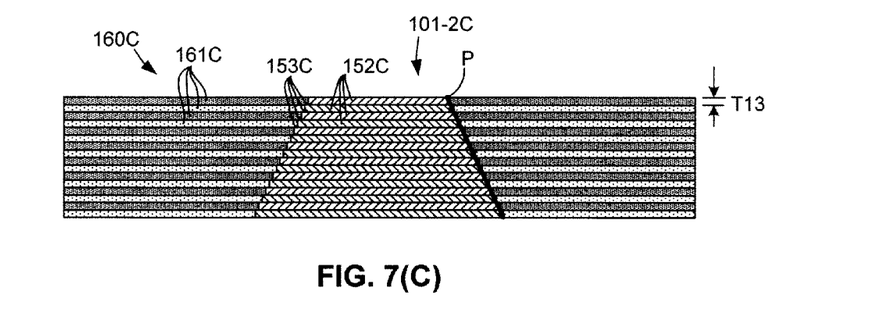

According to another advantage of the present invention, vertical resolution and optimal segmentation are easily enhanced (improved) by varying the mold layer thickness. For example, FIG. 7(A) shows a 3D structure section 101-2A inside a first mold 160A formed by four mold layers 161A having thickness T11 and patterned to replicate a pitch change P, which represents a gradual diameter change of an original 3D structure. Note that because thickness T11 is relatively large, relatively large shoulders 153A are formed between adjacent layers 152A. To enhance vertical resolution (i.e., to reduce the size of the shoulders), the digital description is modified to include a larger number of mold layers for the same vertical structure portion. For example, FIG. 7(B) shows a 3D structure section 101-2B inside a second mold 160B having eight mold layers 161B with smaller layer thickness T12 (e.g., thickness T12 is of thickness T11), whereby 3D structure section 101-2B more closely replicates pitch P because of smaller shoulders 153B separating a larger number of structure sections 152B. As indicated in FIG. 7(C), 3D structure section 101-2C exhibits even smaller shoulders 153C, which are generated by forming a third mold 160C with sixteen mold layers 161C, each having thickness T13 that is ½ of T12. Although the process time is greatly increased by adding additional layers, FIGS. 7(A) to 7(C) illustrate how the present invention can be used to facilitate increased vertical resolution in vertically oriented regions of a structure that exhibit relatively large vertical feature changes by varying the mold layer thicknesses in these vertical regions, while optimizing segment sizes in vertical regions undergoing little vertical change using relatively thick mold layers.

Although the present invention has been described with specific reference to specific processes such as laser patterning, other patterning techniques and other process variations can also be advantageously utilized.

Figure 8A:
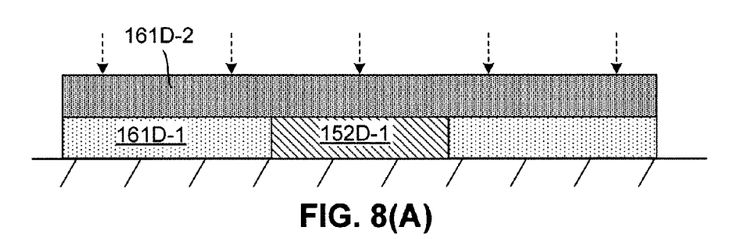
FIGS. 8(A), 8(B) and 8(C) are cross-sectional side views showing the deposition/patterning of a mold layer and the deposition of a modeling material layer according to an alternative embodiment of the present invention.
Figure 8B:
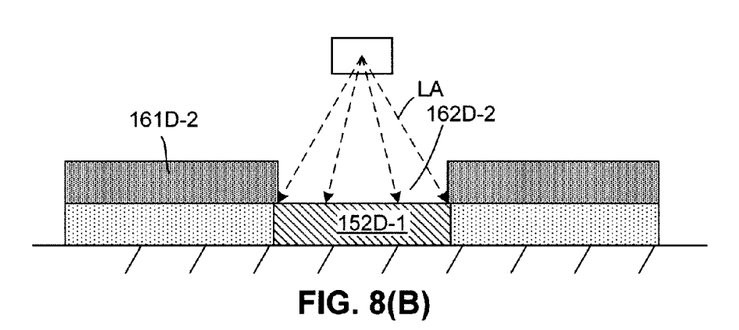

FIGS. 8(A) to 8(C) show the formation of a second structure section 152D-2 on a lowermost structure section 152D-1 that involves patterning of mold layer 161D-2 using laser ablation. As indicated in FIG. 8(A), mold layer 161D-2 is formed over mold layer 161D-1 and structure section 152D-1 in the manner described above with reference to FIG. 2(A). As indicated in FIG. 8(B), a laser beam LA having sufficient energy to evaporate the mold material is directed onto a portion of mold material layer 161D-2 such that laser beam ablates (evaporates or otherwise removes) the targeted portion of mold material layer, thereby forming void portion 162D-2 without requiring the development stage described above. Structure material is then deposited into the void portion to form structure section 152D-2.

Figure 8C:
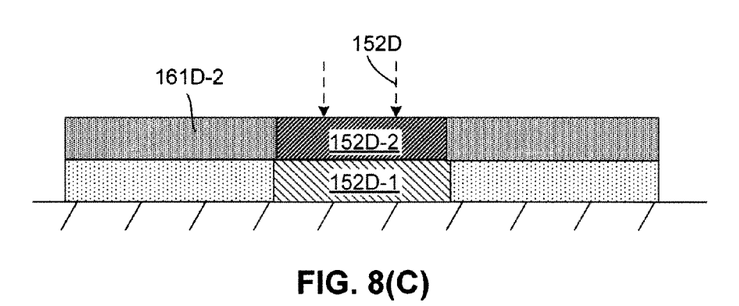

According to another advantage of the present invention indicated in FIG. 8(C), in addition to forming replica 3D structures using a single modeling material, the layer by layer process of the present invention allows for the use of different modeling materials in different layers (e.g., structure section 152D-2 is metal, while structure section 152D-1 is plastic). While the concept of electroplating has been shown in prior art for constructing 3D interconnects, this invention is intended for arbitrary shapes and has the potential to generate a broad range of micro-structures comprised of different materials (not limited to metals). Alternating layers, or even gradients, of materials (polymer, ceramic, metal, etc.) can be deposited in the photoresist mold, and such level of control is unprecedented and is the novel aspect for this invention.

Figure 9A:
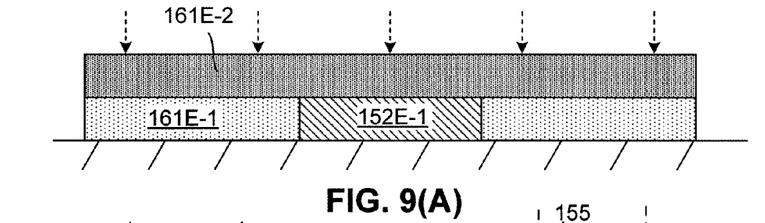
FIGS. 9(A), 9(B), 9(C), 9(D) and 9(E) are cross-sectional side views showing the deposition/patterning of a mold layer according to another alternative embodiment of the present invention.
Figure 9B:
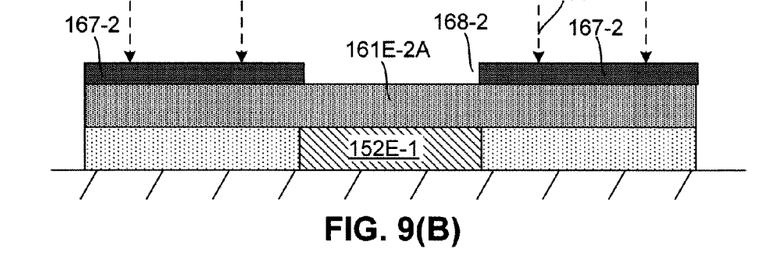
Figure 9C:
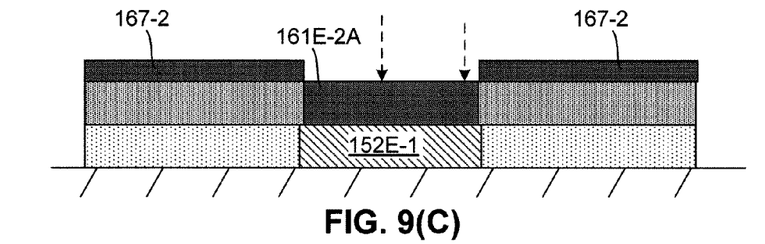
Figure 9D:
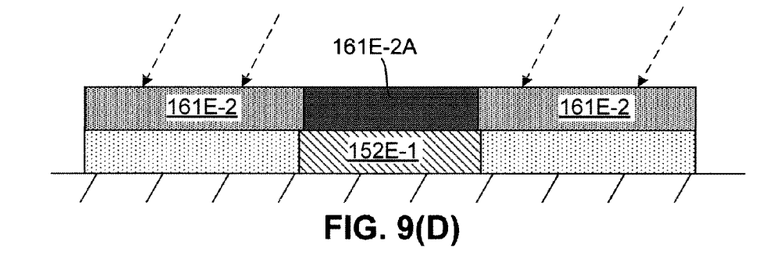
Figure 9E:
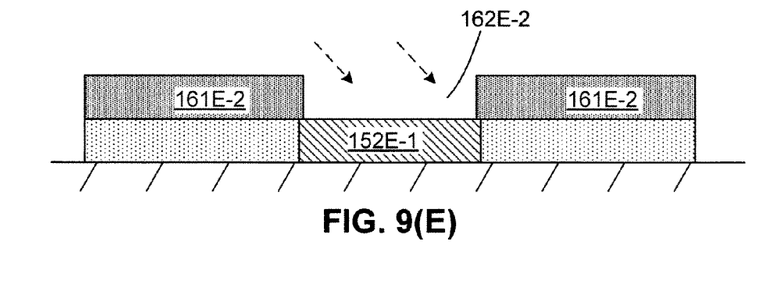

FIGS. 9(A) to 9(E) show yet another specific embodiment utilizing a printed digital mask, which may be implemented when laser patterning or laser ablation systems are not available. FIG. 9(A) depicts the formation of mold layer 161E-2 over lowermost mold layer 161E-1 and structure section 152E-1 in the manner described above with reference to FIG. 2(A). FIG. 9(B) depicts printing a mask material 155 onto mold material layer 161E-2 such that printed mask material 155 forms a printed mask 167-2 that defines an opening 168-2 exposing a target portion 161E-2A of mold material layer 161E-2. The digital mask can be inkjet printed metal or phase change materials such as wax. FIG. 9(C) shows subsequent exposure (e.g., to UV) such that target portion 161E-2A of mold material layer 161E-2 is developed. After development, as indicated in FIG. 9(D), printed mask 167-2 is removed, and then as shown in FIG. 9(E), the developed targeted portion is removed to form void portion 162E-2. Using this method, the digital mask can be changed for each layer, since the uncured liquid metal or wax (heated to liquid phase) can be erased by a roller.

Figure 10A:
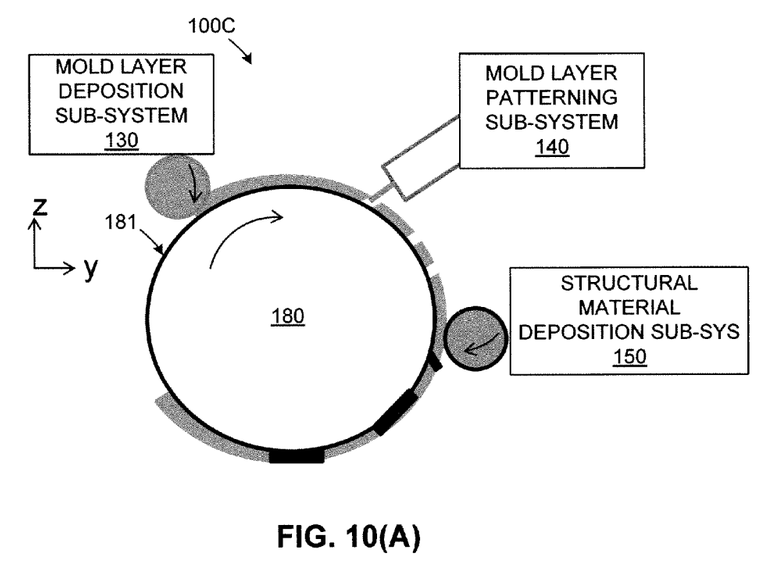
FIGS. 10(A) and 10(B) are simplified side and top diagrams depicting system assemblies according to alternative specific embodiments of the present invention.
Figure 10B:
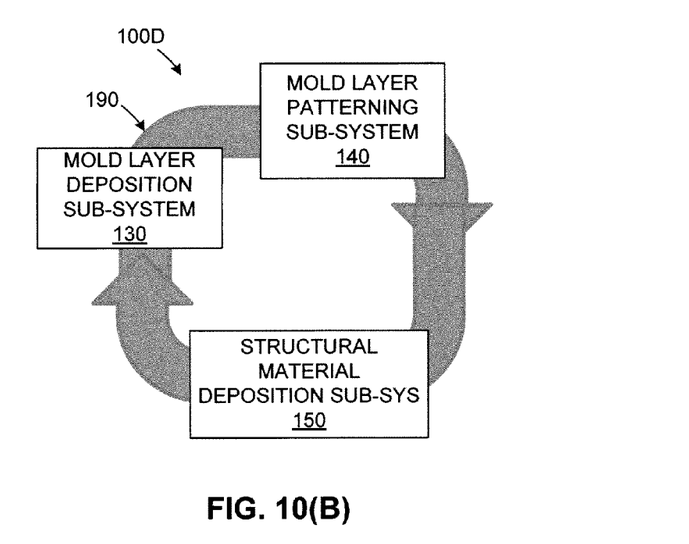

According to yet another advantage of the present invention, the disclosed fabrication technique facilitates the formation of high-speed continuous-loop processing systems that greatly reduce the amount of time required to produce a 3D structure. For example, referring to FIG. 10(A), system 100C utilizes a continuous-loop structure comprising a drum roller 180 (similar to that used in a laser printer) in which 3D structures are formed on a surface 181 of drum roller 180 as it rotates the surface paste the various process stages 130, 140 and 150. FIG. 10(B) shows a belt-type system 100D in which a conveyor belt 190 serves as a continuous-loop structure that conveys the 3D structure under the various process states 130, 140 and 150. These systems provide the advantage of avoiding process pauses (start-and-stop) that are characteristic of current methods, thereby dramatically increasing throughput.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A method for fabricating a three dimensional (3D) structure, the method comprising:

sequentially depositing a plurality of mold material layers such that each of said plurality of mold material layers has a corresponding thickness, and such that the plurality of mold material layers collectively form a multilayer mold;

individually patterning each of the plurality of mold material layers in accordance with a digital description such that each said mold material layer defines a void portion; and sequentially depositing a modeling material into each said void portion before depositing a subsequent mold material layer of said plurality of mold material layers such that said modeling material deposited into an associated said void portion forms a substantially two-dimensional modeling material portion that fills said associated void portion and has the same thickness as an associated said mold material layer defining said associated void portion, whereby said sequentially formed substantially two-dimensional modeling material portions disposed in said plurality of mold material layers collectively form said 3D structure.

2. The method of claim 1, wherein sequentially depositing said plurality of mold material layers comprises depositing photoresist.

3. The method of claim 1, wherein sequentially depositing said plurality of mold material layers comprises depositing a dissolvable sacrificial material.

4. The method of claim 1, wherein sequentially depositing said plurality of mold material layers comprises one of roll coating, spray coating and slot-die.

5. The method of claim 1, wherein sequentially depositing said plurality of mold material layers comprises depositing a first said mold material layer having a first thickness, and subsequently depositing a second said mold material layer over said first mold material layer having a second thickness that is different from said first thickness.

6. The method of claim 1, wherein individually patterning each of the plurality of mold material layers comprises generating said void portion by removing a portion of each said mold material layer that is entirely surrounded by a retained portion of said each mold material layer.

7. The method of claim 1, wherein individually patterning each of the plurality of mold material layers comprises:
  directing a laser beam onto a target portion of said mold material layer;
  exposing said mold material layer such that said target portion of said mold material layer becomes developed; and
  removing said developed target portion of said mold material layer, thereby forming said void portion.

8. The method of claim 1, wherein individually patterning each of the plurality of mold material layers comprises directing a laser beam onto a portion of said mold material layer such that said laser beam ablates said portion of the mold material layer, thereby forming said void portion.

9. The method of claim 1, wherein individually patterning each of the plurality of mold material layers material comprises:
  printing a mask material onto each of the plurality of mold material layers to form a printed mask that defines an opening disposed over a target portion of said mold material layer;
  exposing said mold material layer to UV light such that said target portion is developed;
  removing said printed mask material; and
  removing said developed target portion of said mold material layer, thereby forming said void portion.

10. The method of claim 1, wherein depositing said modeling material portion comprises electroplating said modeling material inside said associated void portion.

11. The method of claim 1, wherein depositing said modeling material portion comprises depositing one of a polymer, a ceramic and a metal material into said associated void portion.

12. The method of claim 1, wherein depositing said modeling material portion into each said void portion comprises depositing a first modeling material portion into a first void portion defined in a first mask material layer, and depositing a second modeling material portion into a second void portion defined in a second mask material layer, wherein said second modeling material portion has a different composition from said first modeling material portion.

13. The method of claim 1, further comprising annealing said deposited modeling material portions.

14. The method of claim 13, wherein depositing said modeling material portion into each said void portion comprises depositing a first modeling material portion into a first void portion defined in a first mask material layer, and depositing a second modeling material portion into a second void portion defined in a second mask material layer, and
  wherein said annealing comprises annealing said first modeling material portion before depositing said second modeling material portion.

15. The method of claim 13,
  wherein depositing said modeling material portion into each said void portion comprises depositing a first modeling material portion into a first void portion defined in a first mask material layer, and depositing a second modeling material portion into a second void portion defined in a second mask material layer, and
  wherein said annealing comprises simultaneously annealing said first and second modeling material portions.

16. The method of claim 1, further comprising visually inspecting at least one of said deposited modeling material portions before depositing a subsequent mold material layer.

17. The method of claim 1, further comprising removing said multi-layered mold from said fabricated 3D structure.

18. The method of claim 1, further comprising disposing said mold material and said modeling material onto a continuous-loop structure.

19. A method for fabricating a three dimensional (3D) mesoscale structure using a digital description of a 3D object, the method comprising:
  depositing a layer of a mold material having a predetermined thickness in the range of 1 µm and 100 µm;
  patterning the layer of said mold material using a portion of the digital description such that the layer defines a void portion having a size corresponding to a cross section of said 3D mesoscale structure;
  depositing a modeling material into said void portion such that said modeling material forms a corresponding substantially two-dimensional section of said fabricated 3D mesoscale structure having the predetermined thickness of the mold material layer; and
  repeating said depositing and patterning until a plurality of said patterned mold material layers, each including a corresponding substantially two-dimensional section having an associated predetermined thickness in the range of 1 µm and 100 µm, form a multi-layered mold that substantially encases a contiguous series of said substantially two-dimensional sections collectively forming said fabricated 3D mesoscale structure.

* * * * *